Oct. 21, 1930.  H. W. LEE  1,779,257
LENS
Filed Oct. 10, 1928
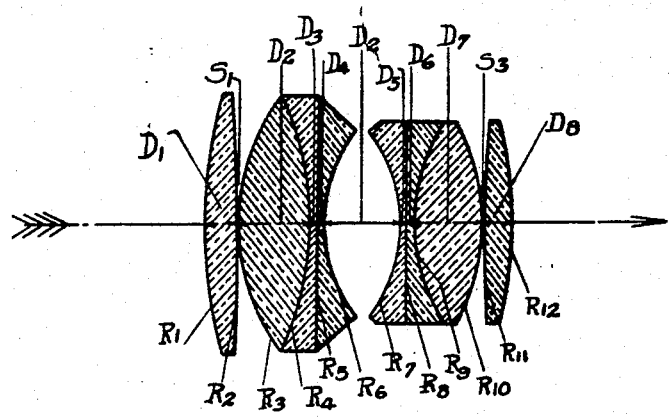
Aperture F/1.5   Flat Field   50°
| Radii | | Thicknesses and Separations | | $n_D$ | V | |
|---|---|---|---|---|---|---|
| $R_1$ | + 1.10 | $D_1$ | .084 | 1.616 | 59.5 | No. 3465 |
| $R_2$ | − 6.97 | $S_1$ | .01 | 1. | | |
| $R_3$ | + .53 | | | | | 7472 |
| $R_4$ | − .81 | $D_2$ | .18 | 1.5837 | 56.1 | |
| $R_5$ | ∞ | $D_3$ | .02 | 1.6501 | 33.6 | 5093 |
| $R_6$ | + .38 | $D_4$ | .02 | 1.5523 | 51.4 | 1078 |
| $R_7$ | − .39 | $S_2$ | .20 | 1. | | |
| $R_8$ | ∞ | $D_5$ | .02 | 1.5523 | 51.4 | 1078 |
| $R_9$ | + .45 | $D_6$ | .02 | 1.6715 | 32.3 | 3994 |
| $R_{10}$ | − .51 | $D_7$ | .18 | 1.6125 | 56.7 | 1453 |
| $R_{11}$ | + .39 | $S_3$ | .01 | 1. | | |
| $R_{12}$ | − .88 | $D_8$ | .07 | 1.616 | 59.5 | 3465 |
The radius is reckoned positive when convex to the on coming light.
INVENTOR
Horace William Lee
BY
Arthur H. Kent
ATTORNEY Patented Oct. 21, 1930

1,779,257

UNITED STATES PATENT OFFICE

HORACE WILLIAM LEE, OF LEICESTER, ENGLAND

LENS

Application filed October 10, 1928, Serial No. 311,434, and in Great Britain October 12, 1927.

The present invention relates to extremely large aperture lenses of the type in which two meniscus lenses of dispersive power are placed between two lenses of collective power. Such lenses have heretofore been made with an aperture of F/2 and flat field of 50° by using doublet dispersive components with the proper choice of glass.

In order to construct a system of larger aperture (F/1.5), the dispersive meniscus components are, in the present invention, made triple, the elements of each of the triple components consisting of a dispersive element of glass of high refractive index cemented between a dispersive element of glass of lower refractive index on the side toward the diaphragm, and a double convex element, also of glass of lower refractive index, on the side remote from the diaphragm.

Data of a lens made according to this invention, corrected for spherical and chromatic aberrations, coma, astigmatism, curvature of the field and distortion, and suitable for use in photography, kinematography, micrography and the like, are given in the following table; and the accompanying drawing shows in axial section a lens embodying the invention. The radii, thicknesses and separations are given in terms of the focal length of the system. The numbers after the specification of the optical properties of the glass used are those in the catalogue of Messrs. Chance Bros. & Co. Ltd.

| Radii | Thicknesses and separations | | $n_D$ | V | No. |
|---|---|---|---|---|---|
| $R_1 +1.10$ | $D_1$ | .084 | 1.616 | 59.5 | 3465 |
| $R_2 -6.97$ | $S_1$ | .01 | 1 | | |
| $R_3 + .53$ | $D_2$ | .18 | 1.5837 | 56.1 | 7472 |
| $R_4 - .81$ | $D_3$ | .02 | 1.6501 | 33.6 | 5093 |
| $R_5 \infty$ | $D_4$ | .02 | 1.5523 | 51.4 | 1078 |
| $R_6 + .38$ | $S_2$ | .20 | 1 | | |
| $R_7 - .39$ | $D_5$ | .02 | 1.5523 | 51.4 | 1078 |
| $R_8 \infty$ | $D_6$ | .02 | 1.6715 | 32.3 | 3994 |
| $R_9 + .45$ | $D_7$ | .18 | 1.6126 | 56.7 | 1453 |
| $R_{10} - .51$ | $S_3$ | .01 | 1 | | |
| $R_{11} +3.9$ | $D_8$ | .07 | 1.616 | 59.5 | 3465 |
| $R_{12} - .88$ | | | | | |

Aperture F/1.5. Flat field 50°.

The radius is reckoned positive when convex to the oncoming light.

It is to be understood that the invention is not to be limited to the specific example which has been given.

What I claim is:

A flat-field lens system for photography, kinematography, micrography and the like, corrected for spherical and chromatic aberrations, coma, astigmatism and distortion, consisting of two simple collective elements enclosing two meniscus dispersive components placed with their concavities face to face, each dispersive component comprising three elements cemented together, a dispersive element of glass of high refractive index being placed between a dispersive element of glass of lower refractive index on the side towards the other dispersive component and a double convex element, also of glass of lower refractive index, on the side towards the outer simple collective element.

In testimony whereof, I have hereunto set my hand.

HORACE WILLIAM LEE.